(No Model.) 2 Sheets—Sheet 1.

H. T. SMITH.
SPEED INDICATOR.

No. 490,889. Patented Jan. 31, 1893.

WITNESSES:
J. F. Finch,
Mattie R. Davis

INVENTOR
Horace T. Smith
BY
A. M. Wooster,
ATTORNEY (No Model.) 2 Sheets—Sheet 2.

H. T. SMITH.
SPEED INDICATOR.

No. 490,889. Patented Jan. 31, 1893.

WITNESSES:
J. F. Hinch.
Mattie R. Davis.

INVENTOR
Horace T. Smith
BY
A. W. Wooster
ATTORNEY

THE NORRIS PETERS CO., PHOTO-LITHO., WASHINGTON, D. C.

UNITED STATES PATENT OFFICE.

HORACE T. SMITH, OF PORT JEFFERSON, NEW YORK.

SPEED-INDICATOR.

SPECIFICATION forming part of Letters Patent No. 490,889, dated January 31, 1893.

Application filed May 23, 1892. Serial No. 434,090. (No model.)

*To all whom it may concern:*

Be it known that I, HORACE T. SMITH, a citizen of the United States, residing at Port Jefferson, in the county of Suffolk and State of New York, have invented certain new and useful Improvements in Speed-Indicators; and I do hereby declare the following to be a full, clear, and exact description of the invention, such as will enable others skilled in the art to which it appertains to make and use the same.

Figure 1:
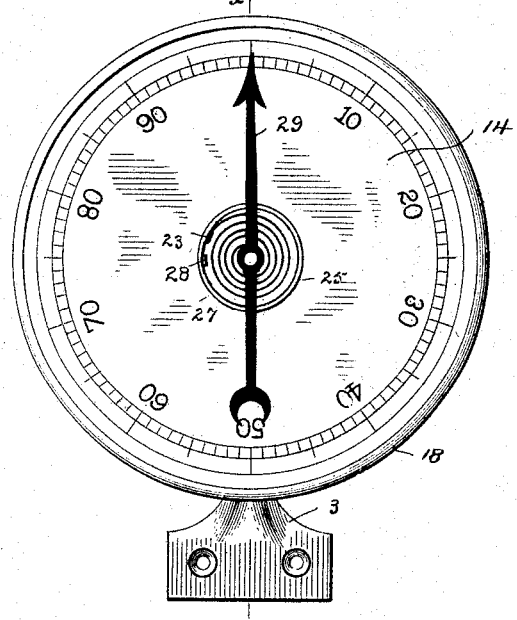
Figure 2:
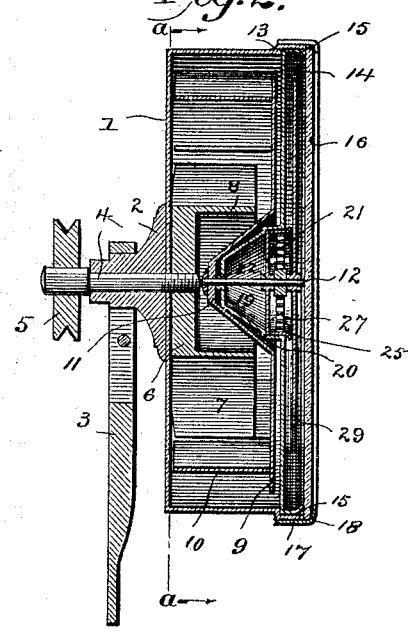

My invention has for its object to produce a simple and inexpensive speed indicator which shall be adapted for use upon all classes of machines where a uniform rate of speed is required. With this end in view I have devised the simple and novel indicator which I will now describe referring by numbers to the accompanying drawings forming part of this specification in which, Figure 1 is a front elevation of my novel indicator, Fig. 2 a section on the line $xx$ in Fig. 1 looking toward the right, Fig. 3 an elevation of the case and the inner disk, the face plate, outer disk and pointer being removed, Fig. 4 a rear elevation of the face plate and outer disk, *i. e.* the parts removed in Fig. 3, Fig. 5 a section on the line $a\ a$ in Fig. 2 looking toward the right, Fig. 6 a view corresponding to Fig. 2 illustrating certain changes I contemplate making in the details of construction, Fig. 7 a section on the line $b\ b$ in Fig. 6 looking toward the left, and Figs. 8, 9, 10, and 11 are detail views illustrating the manner in which the spring is attached in place and the mode of its adjustment, Fig. 9 being a section on the line $c\ c$ in Fig. 8, and Fig. 11 a section on the line $d\ d$ in Fig. 10.

1 denotes the case which is provided at its back with a hub 2 by which it is secured to a standard 3, said standard being preferably provided with screw holes by which the indicator may be attached in place upon a wall or wherever required.

4 denotes a shaft which is journaled in the hub and is provided at its outer end with a belt pulley 5 to receive a belt, not shown, by which the speed of the machine, in connection with which the indicator is used, is communicated thereto. At the inner end of shaft 4 is a disk 6 termed for convenience the inner disk, which is provided with wings or blades 7. These wings may be radial to the shaft, or may be oblique to a radial line therefrom as shown, and they may be straight as shown, or curved. I have simply illustrated the wings or blades as oblique to a radial line from the shaft and straight as I ordinarily use them substantially as shown in Figs. 3, 5 and 7.

In practice I preferably place the wings or blades on the inner disk tangential to an imaginary circle of less diameter than the diameter of a circle intersecting the outer ends of the wings or blades.

Figure 3:
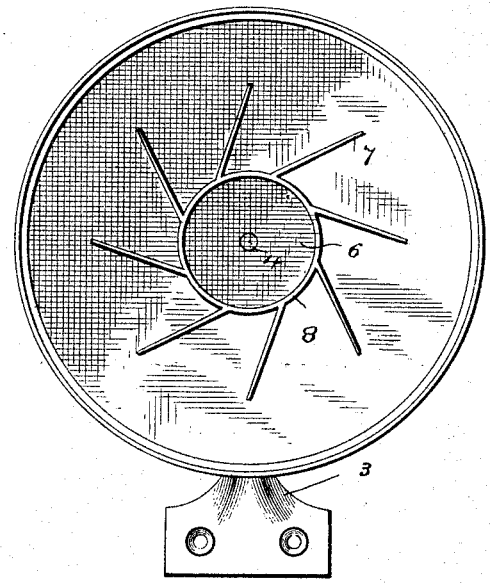
Figure 4:
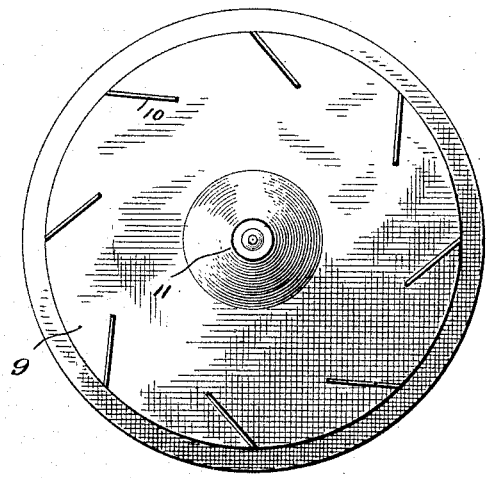
Figure 5:
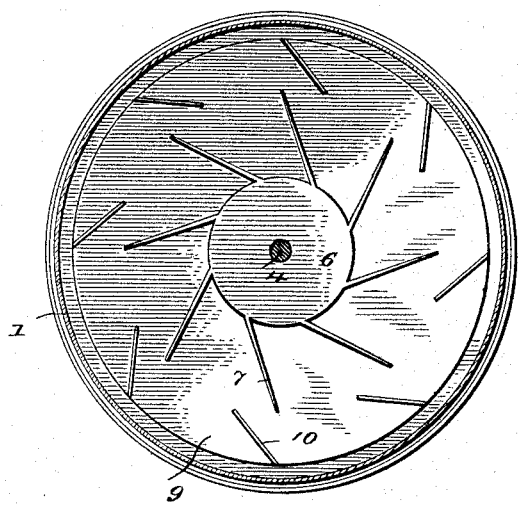

In Figs. 2, 3 and 5 I have shown disk 6 as made relatively small and as provided on its inner face with a circular flange 8, from the outer side of which the wings or blades extend. These wings are shown however, as tangential to a circle of less diameter than the flange.

Figure 6:
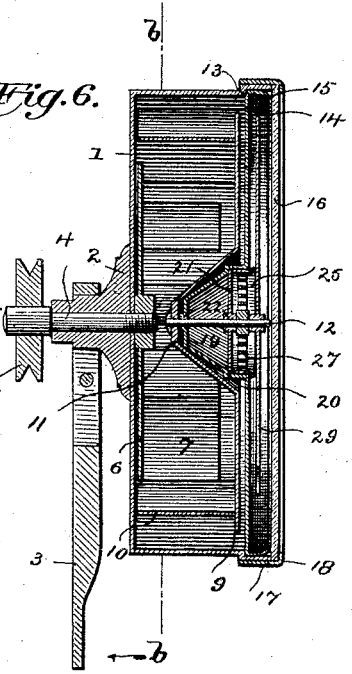
Figure 7:
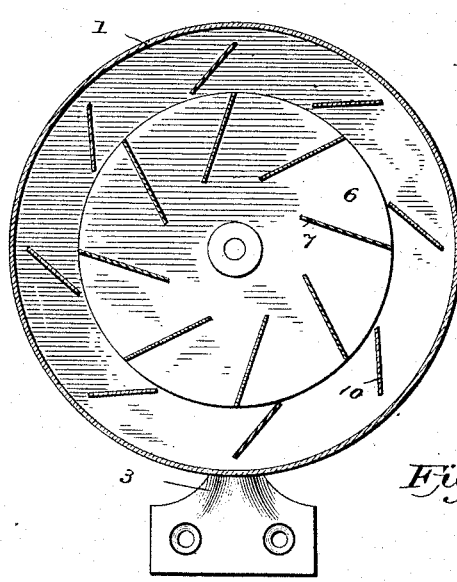

In Figs. 6 and 7 I have shown disk 6 as made relatively large and the wings or blades as attached to the inner face of the disk and extending to the edge thereof.

9 denotes another disk which for convenience I term the outer disk. This disk is also provided with wings or blades 10 which are set to correspond substantially with the wings or blades on disk 6, that is to say, the wings or blades on the two disks are set end to end but not necessarily in line with each other. They may be either radial to the axis of the disk or oblique to a radial line extending therefrom and may be either straight or curved. As I ordinarily use them straight and set oblique to a radial line I have so illustrated them in the drawings, in which they are shown as tangential to an imaginary circle of less diameter than the diameter of the disk. Disk 9, in order to give extended bearing as will presently be explained, is preferably provided with an inwardly extending hub 11 rigidly secured to a shaft 12 which is preferably journaled in the manner which I will now describe. The outer end of the case is made of slightly greater diameter than the body thereof and is provided with an internal shoulder 13. The face plate 14 which also serves as a dial rests upon this shoulder and is provided with an outwardly extending inwardly curved flange 15. The covering glass 16 preferably rests against this flange and against the outer edge of the case and is held in place by a rim 17 provided with an inwardly curved flange 18 which extends over the glass as shown in Figs. 2 and 6 and retains it securely in position by engagement with the outer side of the case. The face plate is provided with an inwardly extending hub 19 which lies within hub 11. In the inner side of hub 19 is a shoulder 20 against which a disk 21 rests. Shaft 12 is journaled in disk 21 and in the inner end of hub 19 on the face plate, bosses 22 being preferably provided on said disk and hub to increase the bearing surface. Disk 21 is provided with an outwardly extending lug 23 the purpose of which will presently be explained.

25 denotes a ring which fits closely within hub 19 its inner edge resting against disk 21, this portion of hub 19 being preferably made straight sided so that the ring may be firmly held in place by frictional contact therewith.

Figures 8, 9:
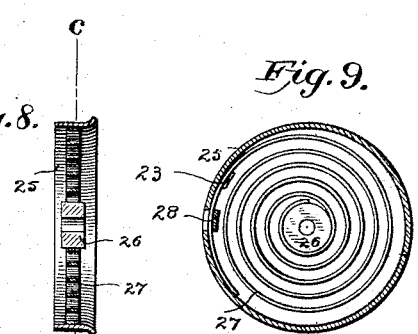
Figures 10, 11:
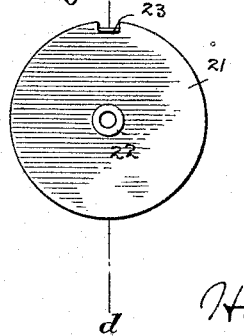

26 denotes a collar on shaft 12 to which the inner end of a spring 27 is attached, the outer end of said spring being adjustably connected to ring 25 by being passed through a loop 28 on the inner side of the ring, said loop being preferably struck in from the metal of the ring as is clearly shown in Fig. 9.

At the outer end of shaft 12 is a pointer 29 which is adapted to move over the face of the dial and to indicate by means of gage marks on the dial the speed at which the machine is running. Should it be desired to increase or decrease the tension of the spring at any time it may be readily accomplished by passing either more or less of the spring through loop 28. A still finer adjustment of the spring may be obtained by means of lug 23 on disk 21. This lug is caused to engage one or more coils of the spring, preferably the outer coil only as shown in Fig. 9. Should it be required at any time to shorten the spring, disk 21 and the lug are turned toward the right,—see Figs. 1 and 9. To lengthen or let out the spring the disk and lug are turned toward the left.

The operation of the indicator is as follows; the power is applied as already stated by means of a belt, not shown, running over pulley 5. This imparts rotation to shaft 4 which carries inner disk 6 having wings or blades 7 thereon,—the rotation of these wings or blades imparts motion to the air within the case which in turn imparts motion to the outer disk 9 by means of the wings or blades 10 thereon. The rotation of the outer disk carries shaft 12 with it against the power of spring 27 causing the pointer to move over the face of the dial. The movement of shaft 12, the outer disk and the pointer will of course continue until the resistance of the spring equalizes the power applied to the wings or blades upon the outer disk by means of air within the case set in motion by the wings or blades upon the inner disk. In setting up the indicator it is of course adjusted when the machine is running at its normal speed. Suppose that the normal speed will carry the pointer around to 60 on the face of the dial. It of course follows that when the pointer registers at 60 the machine is running at its normal speed. If the pointer registers less than sixty the machine is running at less than its normal speed, and suitable means, which of course form no portion of my present invention, are used to increase the power or lessen the load the machine has to carry. On the other hand if the pointer is carried past 60 it indicates that the machine is running at greater than its normal speed and suitable means should be taken to reduce the speed. Should it be required at any time to change the registration of the pointer upon the dial it is simply required to take up or let out the equalizing spring which is readily accomplished by removing the rim and glass, and taking up or letting out the spring by means of loop 28 in the ring, or by means of lug 23 on disk 21. It will of course be understood that the details of construction may be varied within reasonable limits without departing from the principle of my invention.

I claim;

1. A speed indicator consisting essentially of a rotary shaft provided with an inner disk carrying wings, an outer disk carrying wings lying in the same plane as the wings upon the inner disk, a shaft by which the outer disk is carried, a spring the inner end of which is connected to the shaft which carries the outer disk, the outer end thereof being secured to a stationary portion of the device, so that when the shaft carrying the inner disk is placed in motion the shaft carrying the outer disk will be rotated until the power of the spring equalizes the power applied to the shaft carrying the inner disk.

2. A speed indicator consisting of a shaft carrying an inner disk provided with wings, an outer disk having wings lying in the same plane as the wings upon the inner disk, a shaft by which the outer disk is carried, a pointer and a collar on the shaft carrying the outer disk and a spring one end of which is secured to the collar and the other to a stationary portion of the device so that when power is applied to the shaft carrying the inner disk the outer disk and pointer will be rotated until the spring equalizes the power.

3. The combination with shaft 4, belt pulley 5 and disk 6 carrying wings 7, of shaft 12 carrying a disk 9 having wings 10, lying in the same plane as wings 7 a pointer and a collar on said shaft and a spring the inner end of which is connected to the collar, the other end being secured to a stationary portion of the device.

4. The combination with a case having a suitable hub, a shaft 4 journaled in said hub and carrying a belt pulley, and an inner disk provided with wings 7, of a face plate and disk 21, a shaft 12 mounted in said disk and face plate and carrying an outer disk provided with wings 10, lying in the same plane as wings 7 a collar on shaft 12, and a spring the inner end of which is secured to the collar and the outer end to a stationary portion of the device.

5. The combination with shaft 4 and the inner disk having wings 7, the case and the face plate having hub 19, of disk 21 lying in said hub and having lug 23 shaft 12 journaled in said hub and said disk, the outer disk carried by said shaft and having wings 10 lying in the same plane as wings 7 and collar 26 and a spring the inner end of which is connected to the collar and the outer end to a stationary portion of the device, and the outer coil of which is engaged by the lug.

6. The combination with an inner disk having wings 7, an outer disk having wings 10, lying in the same plane as wings 7 and shaft 12 by which the outer disk is carried, of ring 25 having loop 28, and a spring the inner end of which is connected to shaft 12, the other passing through loop 28 so as to be readily adjustable.

7. The combination with the case and the face plate having hub 19 and shoulders 20, of disk 21 resting against said shoulders, ring 25, shaft 12 journaled in said disk and said hub, disk 9 carried by said shaft and provided with wings, disk 6 having wings lying in the same plane as the wings on disk 9 and a spring the inner end of which is connected to shaft 12 and the outer end to said ring.

8. The combination with disk 6 having wings 7, and disk 9 having wings 10 and hub 11, of face plate 14 having hub 19 lying within hub 11 and provided with a shoulder 20, a disk resting against said shoulder, shaft 12 journaled in said disk and hub 19 and carrying disk 9, ring 25 having a loop 28, and a spring the inner end of which is connected to shaft 12 and the other adjustably connected to the ring by means of loop 28.

9. The combination with the inner disk having wings 7, and the outer disk having wings 10 and hub 11, of the face plate having hub 19 and shoulder 20, disk 21 lying against said shoulder and having lug 23, shaft 12 journaled in disk 21 and hub 19 and carrying the outer disk, ring 25 and a spring 27 the ends of which are connected to shaft 12 and to the ring, and the outer coil of which is engaged by the lug.

In testimony whereof I affix my signature in presence of two witnesses.

HORACE T. SMITH.

Witnesses:
IRVING M. SWEZEY,
C. E. TOOKER.